United States Patent [19]

Sashiki et al.

[11] Patent Number: 4,564,103

[45] Date of Patent: Jan. 14, 1986

[54] METHOD AND APPARATUS FOR CONVEYING LINEAR ARTICLES

[75] Inventors: Takashi Sashiki, Nagaokakyo; Keiko Sakaeda, Kyoto, both of Japan

[73] Assignee: Kabushiki Kaisha Ishida Koki Seisakusho, Kyoto, Japan

[21] Appl. No.: 359,138

[22] Filed: Mar. 17, 1982

[30] Foreign Application Priority Data

Mar. 19, 1981 [JP] Japan .................. 56-41093
Jul. 24, 1981 [JP] Japan .................. 56-116837

[51] Int. Cl.[4] .................. B65G 43/08; G01G 19/34
[52] U.S. Cl. .................. 198/358; 177/25; 198/420; 198/505
[58] Field of Search .................. 177/25; 198/426, 429, 198/751, 773–777, 443, 445, 459, 358, 505, 420

[56] References Cited

U.S. PATENT DOCUMENTS

| | | | |
|---|---|---|---|
| 3,468,407 | 9/1969 | Forst | 198/397 X |
| 3,730,386 | 5/1973 | Monsees | 198/444 X |
| 3,939,928 | 2/1976 | Murakami | 177/25 |
| 4,122,941 | 10/1978 | Giles et al. | 198/505 X |
| 4,294,347 | 10/1981 | Furlette et al. | 198/751 |
| 4,308,928 | 1/1982 | Oshima | 177/25 |
| 4,344,492 | 8/1982 | Hirano | 177/25 |

Primary Examiner—Jeffrey V. Nase
Attorney, Agent, or Firm—Staas & Halsey

[57] ABSTRACT

An apparatus for conveying linear articles while maintaining the specific orientation thereof. The apparatus includes a supply station for supplying linear articles having a specific orientation to a plurality of locations, a weighing station for weighing the linear articles deposited in the weighing scales of weighing machines, a pair of walking beams provided along the direction of conveyance with a multiplicity of first holders for taking up the linear articles and with a multiplicity of second holders for taking up the linear articles deposited in the weighing scales of the weighing machines, an electronic computing unit for forming combinations of weight values of the linear articles deposited in the weighing scales of the weighing machines, and for selecting the best combination of weight values whose sum is closest to a preset target weight, and holder drive for actuating those first and second holders which correspond to the weighing machines that give the best combination of weight values. The linear articles are disposed at the plurality of locations and at the weighing stations so as to be situated on circular orbits described by the actuated first and second holders as the walking beams are oscillated. By oscillating the walking beams the linear articles which give the best combination are discharged from the weighing station by the actuated second holders and, at the same time, the weighing scales of the weighing machines giving the best combination are supplied with the articles from the plurality of locations by the actuated first holders.

1 Claim, 19 Drawing Figures

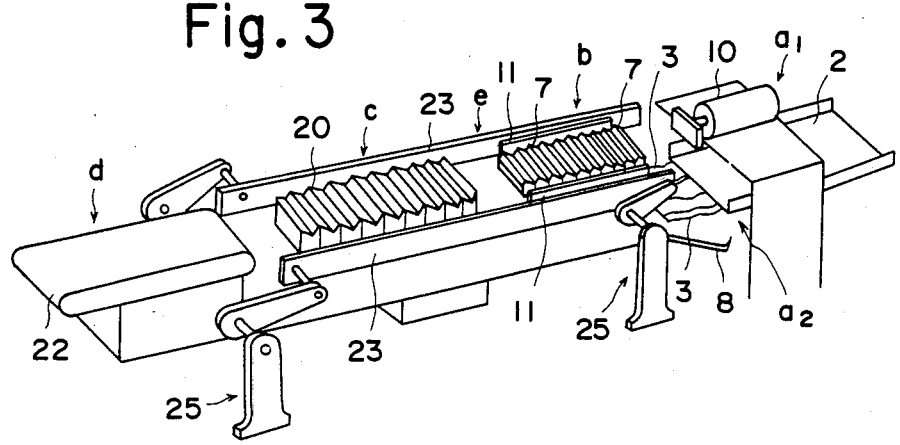
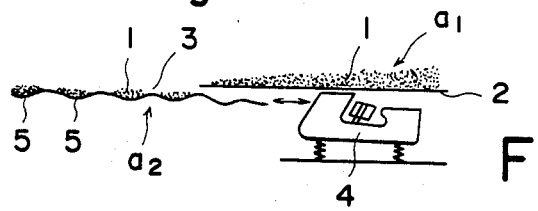
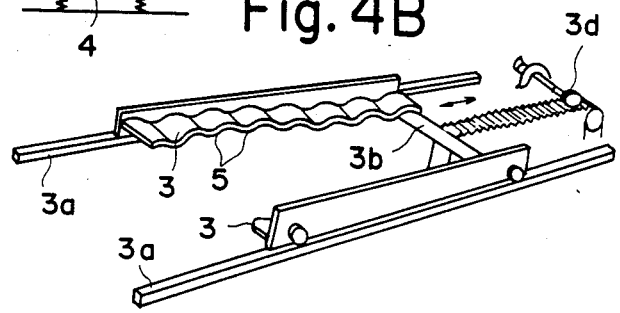
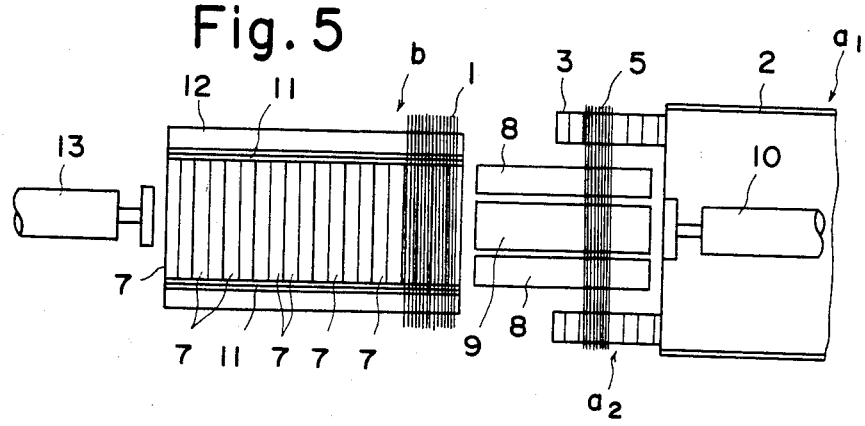

METHOD AND APPARATUS FOR CONVEYING LINEAR ARTICLES

BACKGROUND OF THE INVENTION

This invention relates to a method and apparatus for conveying linear or elongate articles such as dried noodles which are aligned or oriented in a given direction, and is adapted to distributively supply such articles from a single feeding apparatus to a plurality of locations while maintaining their orientation, and to deliver the articles from the locations to which they have been distributed, while still maintaining their orientation. More particularly, the invention relates to a method and apparatus for conveying linear or elongate articles, and is especially well suited for application to a so-called combinatorial automatic weighing system which measures weights by weighing articles through use of a plurality of weighing machines, computing combinations on the basis of the weights measured by the respective machines, and selecting the combination whose weight sum is equal or closest to a predetermined target weight.

An automatic weighing system which is known in the art relies upon a combination computing function. The system performs a weighing operation by combining the individual weight values measured by a plurality of weighing machines, computing the total weight of the weight values in each and every combination, and selecting the combination whose total weight is equal or closest to a predetermined target weight. Unlike the older automatic weighing apparatus which weighs articles on a single weighing machine while controlling the supply of articles to that weighing machine, the combinatorial system features great accuracy and excellent operability and enables articles to be weighed out to a preset weight value in a short period of time.

The above-mentioned combinatorial automatic weighing system operates by measuring the weights of articles which have been fed to a plurality of weighing machines, forming all possible combinations of the actually measured weight values, with the number of weight values in each combination being either arbitrary or predetermined, adding the weight values in each combination, comparing each resulting sum with a predetermined target weight, and selecting the combination whose weight sum is equal or closest to the target weight. This particular combination of weights is referred to as the best combination.

The combinatorial automatic weighing system of the above type requires a conveyance apparatus in order to fully exploit its weighing function. Such an apparatus serves to distributively supply the plurality of weighing machines with the articles in good order and at an adequate speed, to deliver the articles from any of the weighing machines that have been selected as belonging to the best combination, and to provide a fresh supply of the articles to those weighing machines that have delivered their contents in the previous step.

The conventional conveyance apparatus of this type makes use of a dispersing bowl or of radially extending troughs. The latter is adopted in the combinatorial automatic weighing system shown schematically in FIG. 1. MS denotes a main feeder of a vibratory conveyance type, using the radially arrayed trough mentioned above. Articles to be weighed are introduced into the main feeder MS and imparted with vibratory motion so as to be dispersed radially outward from the center thereof. CN, CN . . . denote n-number of weighing sections which are arranged around the main feeder MS along radially extending lines to receive the articles dispersed by the main feeder. Each weighing section CN includes a dispersing feeder $CN_a$, a holding vessel $CN_b$, a weighing hopper $CN_d$, a weight sensor $CN_e$, and a weighing hopper gate $CN_f$. The dispersing feeder $CN_a$ comprises an independently vibratable conveyance device for feeding the articles by means of vibration, or an independently operable shutter device for delivering the articles in batches. In either case, each dispersing feeder $CN_a$ is so arranged that the articles received from the centrally located main feeder MS can be introduced into the corresponding holding vessel $CN_b$ disposed therebelow. The holding vessel gate $CN_c$ is provided on each holding vessel $CN_b$ in such a manner that the articles received in the holding vessel are released into the weighing hopper $CN_d$ when the gate $CN_c$ is opened. Each weight sensor $CN_e$ is attached to the corresponding weighing hopper $CN_d$ and is operable to measure the weight of the articles introduced into the weighing hopper. The weight sensor $CN_e$ is adapted to supply a combination control unit (not shown) with an electric signal indicative of the measured weight. The combination control unit then selects the optimum combination of articles, i.e., the best combination, that gives a total weight closest to a target weight. Each of the weighing hopper gates $CN_f$ is provided on the corresponding weighing hopper $CN_d$. Only those weighing hopper gates $CN_f$ provided on the weighing hoppers $CN_d$ that will give the best combination are opened. The articles from the weighing hoppers $CN_d$ selected in this manner fall through the open weighing hopper gates and are discharged into a common collecting chute GS where they are collected together. The collecting chute GS has the shape of a funnel and is so arranged as to receive the articles from any of the circularly arrayed weighing hoppers $CN_d$ via the hopper gates, which are located above the funnel substantially along its outer rim. The articles received by the collecting chute GS are collected at the centrally located lower end thereof by falling under their own weight or by being forcibly shifted along the inclined wall of the funnel by a mechanical scraper or the like, which is not shown. The collecting chute GS is provided with a timing hopper THP at the lower end thereof for temporarily holding the collected articles. The arrival of an externally applied signal for a packing device or the like causes the timing hopper THP to release the retained articles from the weighing apparatus.

In operation, the holding vessels $CN_b$ and weighing hoppers $CN_d$ initially contain a supply of the articles. The weight sensors $CN_e$ associated with the respective weighing hoppers $CN_d$ measure the weights of the articles in each hopper and produce weight values $W_1$ through $W_{10}$ which are sent to the combination control unit, not shown. The control unit performs an arithmetic combinatory control operation using the weight values $W_1$ through $W_{10}$ and selects the combination of articles that gives a total weight closest to the set target weight. A drive control unit (not shown) opens the weighing hopper gates $CN_f$ that are selected on the basis of the best combination, whereby the selected weighing hoppers deliver their articles to the collecting chute GS. Now the holding vessel gates $CN_c$ of those holding vessels $CN_b$ corresponding to the empty weighing hoppers $CN_d$ are opened to introduce a fresh supply of the articles into said weighing hoppers, leaving said holding vessels empty. Next, the dispersing feeders $CN_a$ which correspond to the empty holding vessels $CN_b$ are vibrated for a predetermined period of time to deliver a fresh supply of the articles to said holding vessels. This restores the weighing apparatus to the initial state to permit resumption of the control operation for selecting the best weight combination in the manner described. Thus, weighing by the combinatorial scale may proceed in continuous fashion by repeating the foregoing steps.

The conventional conveyance apparatus used in the combinatorial weighing system described above distributes or disperses the articles radially outwardly from the sole main feeder consisting of the radially extending troughs. With such an arrangement, however, any orientation which the articles may possess is lost. This does not pose a problem in the conveyance of bulky products such as fruits, green peppers, potatoes and the like since these need not be oriented when conveyed. The problem arises in the conveyance of elongate or linear articles such as dried noodles which must all have a specific orientation in order to be packed correctly. Such articles lose their orientation when conveyed by the conventional apparatus and arrive at the packaging machine in a state of disarray.

An example of a linear article such as mentioned above is illustrated in FIG. 2A, which shows a single dried noodle DR. In the packaging process a multiplicity of the dried noodles DR are bundled together by paper bands PBT, as illustrated in FIG. 2B. It can be understood that such bunding involves major difficulties when the dried noodles are delivered to the packaging apparatus in a randomly oriented manner.

SUMMARY OF THE INVENTION

Accordingly, an object of the present invention is to provide a method and apparatus for conveying linear or elongate articles to enable the articles to be distributively supplied from a feeding device to a plurality of locations without there being any change in the specific orientation of the articles.

Another object of the present invention is to provide a method and apparatus for conveying linear or elongate articles from a plurality of locations, which have been distributively supplied with such articles, to each of the weighing machines of a weighing system without there being any change in the specific orientation of the articles.

Yet another object of the present invention is to provide a method and apparatus for conveying linear or elongate articles which enable such articles to be discharged from each of the weighing machines of a weighing system into a discharge area without there being any change in the specific orientation of the articles.

Still another object of the present invention is to provide a method and apparatus for conveying linear or elongate articles, which method and apparatus are well suited for application to an automatic weighing system of the combination computing type.

A further object of the present invention is to provide a conveying method and apparatus for effecting simultaneously the discharge of linear or elongate articles from weighing machines and the supply of such articles to weighing machines.

Other features and advantages of the invention will be apparent from the following description taken in conjunction with the accompanying drawings in which like reference characters designate the same or similar parts throughout the figures thereof.

BRIEF DESCRIPTION OF THE DRAWINGS

FIG. 3 is a perspective view showing the general construction of a first embodiment of a conveyance apparatus according to the present invention;

FIG. 4A is a diagrammatic side view showing a supply station of the conveyance apparatus;

FIG. 4B is a diagrammatic perspective view showing a dispensing station of the conveyance apparatus;

FIG. 5 is a plan view showing the principal portions of the dispensing station and of a holding station of the conveyance apparatus;

FIGS. 16 and 17 are diagrammatic views of a second embodiment of a conveyance apparatus according to the present invention, in which FIG. 16 is a plan view and FIG. 17 a sectional view.

DESCRIPTION OF THE PREFERRED EMBODIMENTS

Figure 1:
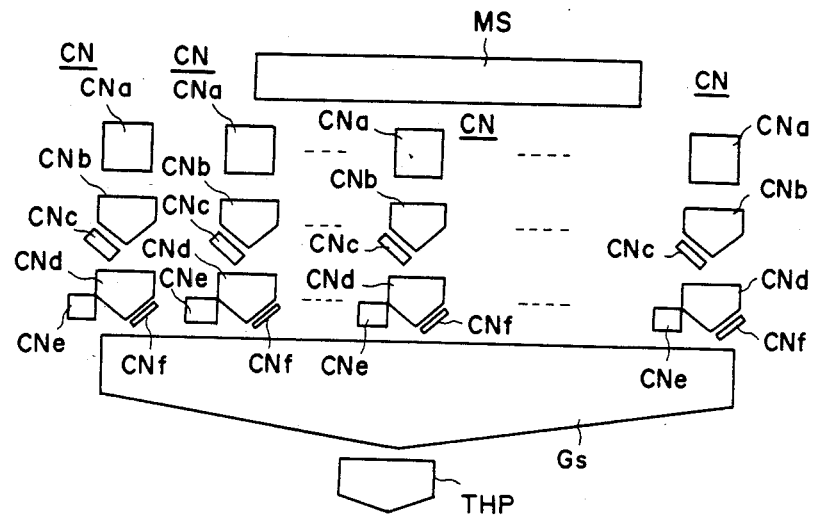
FIG. 1 is a schematic view for describing the structure and operating principle of a combination computing-type automatic weighing system which employs of radially arrayed trough.
Figure 2A:
FIG. 2A is a perspective view of a single dried noodle.
Figure 2B:
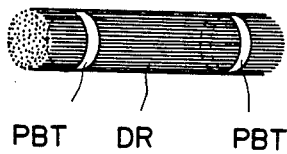
FIG. 2B is a perspective view showing a multiplicity of the dried noodles tied into a single cluster.

Reference will now be had to FIG. 3 to describe a first embodiment of a conveyance apparatus according to the present invention. The apparatus comprises a supply station $a_1$ for supplying linear or elongate articles upon endowing them with a specific orientation, a dispensing station $a_2$ for randomly dispensing a required number of the oriented linear articles supplied by the supply station $a_1$, a holding station b for aligning individual ones of the dispensed linear articles, a weighing station c for weighing the linear articles obtained from the holding station b to perform a combinatorial weighing operation, a discharge station d for delivery of linear articles which have been weighed and selected by the weighing station c to an automatic packaging machine or the like, and a selective conveyance station e which is provided astride the holding station b, weighing station c and discharge station d for selectively delivering the linear articles from the holding station b to the weighing station c and from the weighing station c to the discharge station d.

The supply station $a_1$ and dispensing station $a_2$ are shown in greater detail in FIGS. 4A and 4B. The supply station $a_1$ includes a main trough 2 which conveys the necessary quantity of linear articles 1 by vibrating accordingly, and the dispensing station $a_2$ includes a corrugated trough 3 for receiving the linear articles 1 from the main trough 2. The main trough 2 is set upon an ordinary electromagnetic feeder 4, as depicted in FIG. 4A, by which the trough is vibrated at the appropriate time to convey the linear articles. The corrugated trough 3 has a plurality of corrugations 5, each of which serves to receive a predetermined quantity of the linear articles. More specifically, the corrugated trough 3 is disposed below the front end of the main trough 2 and is moved back and forth in a suitable manner while the main trough 2 is vibrated, whereby each corrugation 5 in the corrugated trough 3 receives an approximately equivalent quantity of the linear articles which fall from the front end of the main trough 2 as it is vibrated. The corrugated trough 3 is divided centrally to support the linear articles 1 at both ends thereof, thereby forming left and right troughs 3,3.

FIG. 4B illustrates the mechanism for moving the corrugated troughs 3,3 back and forth in the manner described above. The corrugated troughs 3, 3 are mounted for free back-and-forth movement on respective rails 3a, 3a which are supported below the front end of the main trough. Specifically, the two corrugated troughs 3, 3 are coupled to each other by a coupling rod 3b, and a rack 3c is connected to the coupling rod 3b. Engaging with the rack 3c is a pinion 3d reversibly rotatable by driving means such as a motor, not shown. Actuating the driving means to rotate the pinion in the forward and reverse directions causes the rack 3c to move the corrugated troughs 3, 3 back and forth along the rails 3a, 3a in a prescribed manner, whereby the number of corrugations 5 that are necessary for distributing the desired amount of linear articles are made to project from the front or leading edge of the main trough 2.

Figure 6:
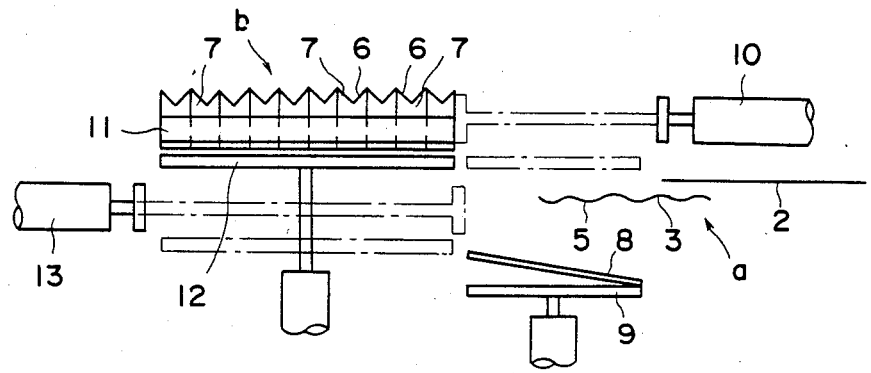
FIG. 6 is a side view showing the principal portions of the dispensing and holding stations of the conveyance apparatus.

The holding station b, as illustrated in FIGS. 5 and 6, comprises a plurality of stock receptacles 7 each of which has a V-shaped groove 6, a pair of sloping members 8 for supporting the stock receptacles 7, a first elevator 9 for lifting the stock receptacles 7 supported on the sloping members 8, a first pushing device 10, such as a cylinder, for pushing forwardly the stock receptacles 7 lifted by the elevator 9, a pair of retaining plates 11 and a second elevator 12 which cooperate to retain the stock receptacles 7 pushed forward by the first pushing device 10, and a second pushing device 13, such as a cylinder, for pushing the stock receptacles 7 back onto the sloping members 8 from the second elevator 12 when the second elevator is in its lowered position. The stock receptacles 7 are so dimensioned as to be able to pass between the corrugated troughs 3 without striking them, and each stock receptacle 7 is disposed so as to correspond to one of the corrugations 5 of the corrugated troughs. The stock receptacles 7 when pushed back onto the sloping members 8 slide therealong under their own weight and are collected at the back thereof.

The first elevator 9, ordinarily situated below the pair of sloping members 8, is raised at the prescribed time between the pair of sloping members 8 and the pair of corrugated troughs 3 in order to lift the stock receptacles 7 from the sloping members 8 to a point above the corrugated troughs 3. The second elevator 12 ordinarily is raised to a point below the retaining plates 11 to underlie and thus support the stock receptacles 7 retained by the retaining plates. When the second elevator 12 is lowered, it carries with it only the stock receptacles 7 released by the retaining plates 11 in a manner described below, the stock receptacles lowered by the second elevator 12 being returned to the sloping members 8 by the second pushing device 13, as mentioned above.

Figure 7:
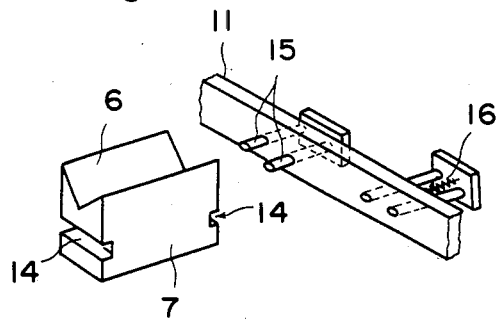
FIGS. 7 and 8 are perspective views, and FIG. 9 a sectional view, showing retaining means for stock receptacles in the holding station.

One example through which the stock receptacles 7 may be retained by the retaining plates 11 is shown in FIG. 7. Each stock receptacle 7 has locking grooves 14, 14, extending in the direction of conveyance, formed in both side surfaces thereof. Fitted through holes provided in each of the retaining plates 11 are sets of retractable locking pins 15, 15, consisting of two locking pins each. The locking pin sets are provided at positions corresponding to respective ones of the stock receptacles and, along with the retaining plates 11, are operatively coupled to electromagnetic solenoids, which are not shown. Energizing the solenoids drives the locking pins 15, 15 into engagement with the locking grooves 14, 14 of the stock receptacles 7 to retain them between the retaining plates 11. De-energizing the solenoids retracts the locking pins 15, 15 from engagement with the locking grooves 14, 14 by allowing respective springs 16 to urge them in the opposite direction, whereby the stock receptacles 7 are released from the retaining plates 11.

Figure 8:
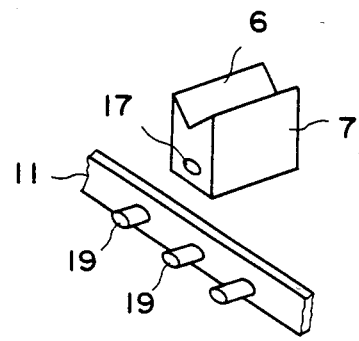
Figure 9:
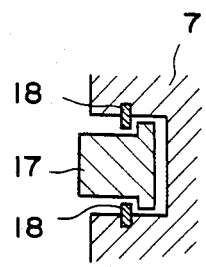

Another example of means for retaining the stock receptacles 7 is shown in FIGS. 8 and 9. Here each stock receptacle 7 has a magnetic body 17 implanted in both sides thereof and held in place by retaining pins 18. Each retaining plate 11 is provided with electromagnetic coils 19 at positions corresponding to respective ones of the stock receptacles 7, particularly their magnetic bodies 17. Energizing the electromagnetic coils 19 attracts the opposing magnetic bodies 17 to retain the respective stock receptacles 7 in place on the retaining plates 11; de-energizing the coils releases the stock receptacles.

Figure 10:
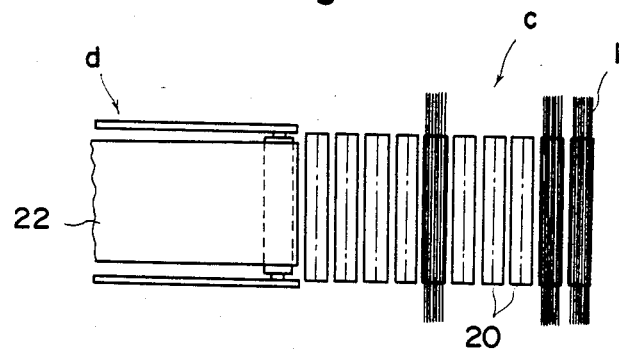
FIG. 10 is a plan view of a weighing station.
Figure 11:
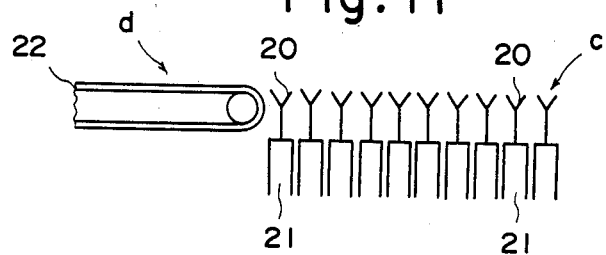
FIG. 11 is a side view of the weighing station.

The weighing station c, best shown in FIGS. 10 and 11, includes a plurality of equally spaced-apart weighing machines 21, 21 . . . each having a V-shaped weighing scale 20. The arrangement is such that the weight values measured by the weighing machines 21, 21 . . . are sent to an electronic computing circuit (not shown) for computing combinations. The weighing scales 20 and the stock receptacles 7 are the same in number, and both are so designed as to be shorter than the linear articles 1 conveyed.

The discharge station d, also best shown in FIGS. 10 and 11, comprises a belt conveyor 22 whose width is less than the length of the articles 1 conveyed.

The dispensing, holding, weighing and discharging stations $a_2$, b, c, and d, respectively, are arranged continuously along a straight line in the conveyance direction.

Figure 12:
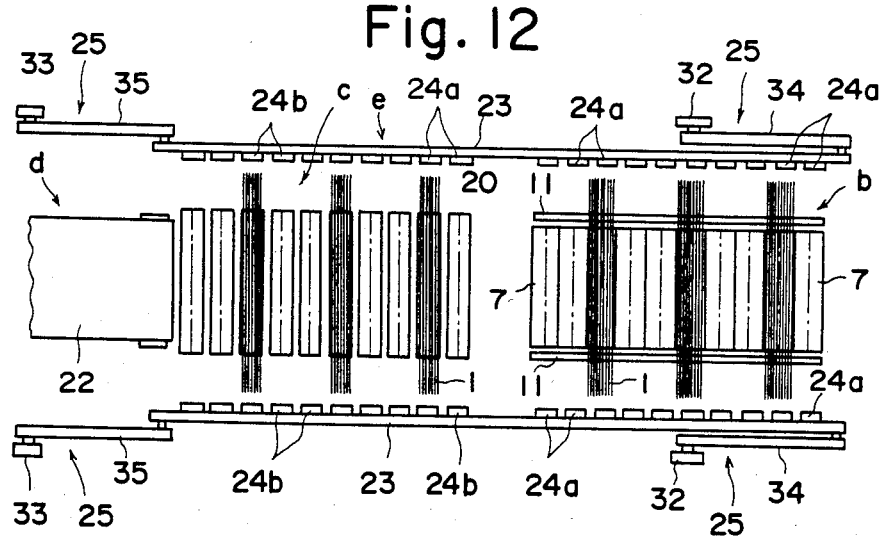
FIG. 12 is a plan view showing the arrangement of a selective conveyance station which is provided astride the holding and weighing stations.
Figure 13:
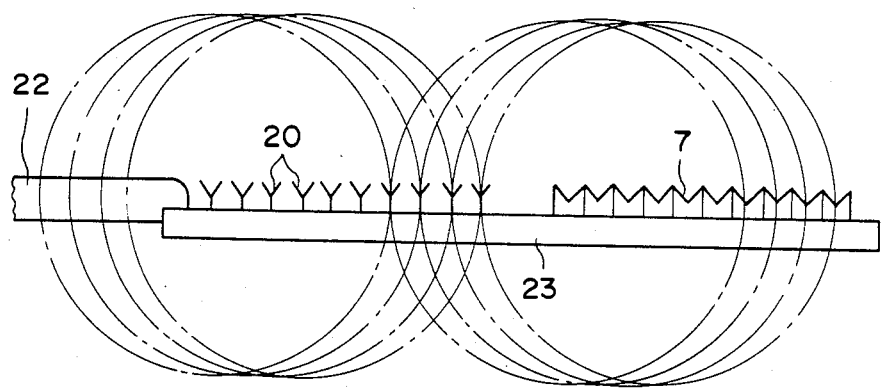
FIG. 13 is an illustrative view which is useful in explaining the orbits described by a walking beam.
Figure 14:
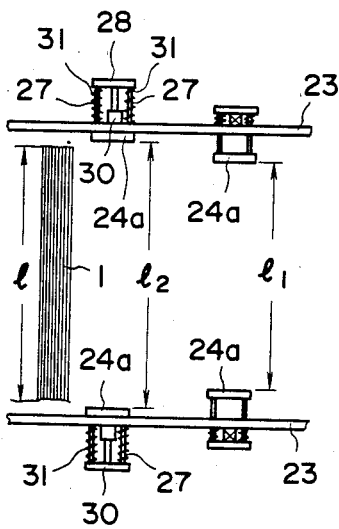
FIG. 14 is a plan view which illustrates the relationship among the walking beam, holders and linear articles.
Figure 15:
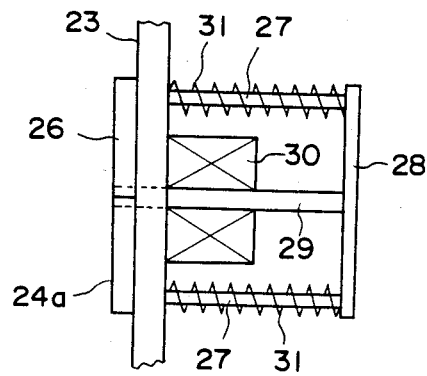
FIG. 15 is an enlarged view of a holder mounting structure.

The selective conveyance station e, as illustrated in FIGS. 12 and 13, comprises a pair of walking beams 23, 23 which bridge the holding station b and weighing station c, holders 24a, 24b which are retractably mounted on the walking beams 23, 23, and crank mechanisms 25 for actuating the walking beams 23, 23. The walking beams 23, 23 extend in parallel and are spaced apart by a distance which is sufficiently greater than the length of the linear articles 1, and are ordinarily disposed just below the holding station b and weighing station c at the sides thereof. The holders 24a, 24b as illustrated in FIGS. 14 and 15, each include a V-shaped member 26, supporting arms 27, 27 for supporting the V-shaped member on the inner side of the walking beam, the supporting arms being retractably mounted on the walking beams 23, 23 at positions corresponding to the stock receptacles 7, an electro-magnetically attracted plate 28 attached to the outer ends of the supporting arms 27, 27, a centrally provided guide rod 29, an electromagnetic coil 30 affixed to the guide rod 29, and springs 31, 31 disposed on the supporting arms 27, 27. When the electromagnetic coil 30 is energized, therefore, the plate 28 is attracted toward the coil and causes the V-shaped member 26 of the holder to be thrust inwardly of the walking beam 23 by the supporting arms 27, 27 thereof while compressing the springs 27. When a pair of opposing holders on the walking beams 23, 23 are actuated in this manner, the distance $l_1$ between them is made shorter than the length l of the linear articles 1, as shown in FIG. 14, whereby the opposing holders come to be situated below the articles 1 at each end thereof. De-energizing the electromagnetic coil 30 allows the compressed springs 31, 31 to retract the supporting arms 27, 27 so that the V-shaped member 26 of the holder is moved back toward the walking beam 23. Actuating a pair of opposing holders in this fashion moves them apart to a distance $l_2$, which is greater than the length l of the linear articles.

The holders 24a, 24b are provided at positions corresponding to the stock receptacles 7 of the holding station b and the weighing machines 21 of the weighing station c. Only the electromagnetic coils 30, 30 of those holders 24a, 24b which correspond to the best combination computed by the computing unit are energized simultaneously in the holding station b and weighing station c, with pairs of opposing holders being actuated by the respective coils.

The walking beams 23, 23 are supported, front and rear, by means of the crank mechanism 25. This is accomplished by pedestals 32, 32 and 33, 33 at the front and rear ends of the walking beams, and crank arms 34, 34 and 35, rotatably mounted at one end thereof to respective ones of the pedestals 32, 32, 33, 34, the front and rear ends of the walking beams 23, 23 being rotatably affixed to the crank arms 35, 35 and 34, 34, respectively, at the other ends thereof. As the crank arms 34, 34, 35, 35 rotate, they cause the walking beams 23, 23 to move in such a manner that each of the holders 24a, 24a . . ., 24b, 24b . . . affixed to the walking beams concurrently describe the circles shown in FIG. 13. These circular orbits show that the holders 24a, 24a . . . of the holding station b travel from points below the holding station b to points above, thence to points above the weighing station c to points below, before returning to their original positions underlying the holding station. They show also that the holders 24b, 24b of the weighing station c travel likewise from points below the weighing station c to points above, then to points above the discharge station d to points below, before returning to their original positions underlying the weighing station. It should be noted that the holders 24a, 24a . . . of the holding station b and the holders 24b, 24b . . . of the weighing station c are equal in number and are so arranged as to correspond to each other. This means that the orbital paths traversed by, say, the first pair of opposing holders 24a, 24a at the far right of the holding station b in FIG. 12 will carry them to the first pair of opposing holders 24b, 24b at the far right of the weighing station c, and so on through the last pair of opposing holders.

In the operation of the apparatus described above, a feeding device (not shown) supplies the main trough 2 successively with linear articles 1 which are orientated at right angles to the direction of conveyance. The linear articles 1 are advanced along the main trough 2 (to the left in FIG. 3) by the vibratory motion of the electromagnetic feeder 4 (FIG. 4A) and fall into each of the corrugations 5 of the corrugated trough 3 which is projected beyond the forward edge of the main trough 2 in advance, whereby a predetermined number of the linear articles 1 are randomly dispensed. The number of corrugations 5 to be projected beyond the forward edge of the main trough 2 is preset to half the number of weighing machines 21, 21, . . . provided. Thus if their are ten weighing machines, five of the corrugations will receive linear articles.

As the corrugated trough 3 is being supplied with the linear articles by the dispensing operation of the main trough 2, the forward half of the stock receptacles 7, 7 . . . are released onto the supporting underlying second elevator 12 from the retaining plates 11 in the manner described above, and the second elevator 12 is then lowered to carry the released stock receptacles downwardly along with it, this taking place in sync with the above-mentioned dispensing operation. When the second elevator 12 reaches it lowermost position, the second pushing device 13, shown in FIGS. 5 and 6, pushes the lowered stock receptacles 7, 7 . . . off the second elevator 12 and onto the sloping members 8 where the receptacles are collected. The second pushing device 13 then returns to its original position, and the second elevator 12 is raised again to its uppermost position to support the remaining stock receptacles. Next, the first elevator 9 is raised to lift the stock receptacles 7, 7 . . . from the sloping members 8, in the course of which the linear articles 1 awaiting in the corrugations 5 of the corrugated trough 3 are transferred to the V-shaped grooves 6 in corresponding ones of the stock receptacles 7. Now, with the first and second elevators 9, 12 in their uppermost positions, the retaining plates 11 release the remaining stock receptacles 7, and the first pushing device 10 pushes the stock receptacles, which are carrying the linear articles 1, from the first elevator 9 onto the second elevator 12, these stock receptacles pushing the other remaining empty stock receptacles ahead of them on the second elevator. When all of the article-carrying stock receptacles 7 have been pushed onto the second elevator 12, the retaining plates 11 are actuated to again retain all stock receptacles, both those that are empty and those that are carrying the linear articles 1. The first pushing device 10 is now retracted to its original position, and the first elevator 9 is lowered to its former position. When the latter takes place, the main trough 2 is again vibrated by the electromagnetic feeder 4 to dispense a fresh supply of the linear articles 1 into the proper number of corrugations 5 of the corrugated trough 3. Thenceforth the remaining empty stock recepticles 7, 7 retained by the retaining plates 11 on the second elevator 12 are submitted to the series of operations described above to supply them with the linear articles 1. When this second series of operations is completed, all of the stock receptacles 7, 7 . . . will hold a supply of the linear articles 1 and will be aligned on the second elevator 12 while being retained by the retaining plates 11.

Next, all of the holders 24a, 24a ... mounted on the walking beams 23, 23 in the holding station b are projected inwardly of the walking beams by exciting the respective electromagnetic coils 30, 30 (see FIGS. 12, 14 and 15). This positions the holders 24a, 24a ... beneath the ends of the articles 1 held in corresponding ones of the stock receptacles 7, 7 ... Under these conditions the crank arms 34, 34, 35, 35 are rotated to move the walking beams 23, 23 in the manner described above in connection with FIG. 13. This causes the linear articles 1 held in the stock receptacles 7, 7 ... to be received by the projecting holders 24a, 24a ... and to be transferred to the corresponding weighing scales 20, 20 ... of the weighing machines 21, 21 ... thereby, along the paths shown in FIG. 13. During this initial supply of the articles 1 the walking beams 23, 23 are moved without the holders 24b, 24b corresponding to the weighing machines in the weighing station being projected inwardly of the walking beams.

Initially, therefore, all of the stock receptacles 7, 7 ... have their linear articles 1 carried from the holding station b to the weighing station c and transferred to the corresponding weighing machines 21, 21. Following the transfer the stock receptacles, all of which will be empty, are again submitted to the foregoing series of operations to provide them with a fresh supply of the linear articles 1 and to array the articles on the second elevator 12.

When the weighing scales 20, 20 ... of the weighing machines 21, 21 ... receive the supply of articles 1 from the stock receptacles, each weighing machine weighs the articles received in its weighing scale and sends a signal indicative of the weighed value to the electronic computing circuit, not shown. This circuit computes combinations on the basis of the received weight values and selects the best combination, that is, the combination of weight values whose sum is equal or closest to a preset target value. Specifically, the computing circuit selects the weighing machines 21, 21 ... that give the best combination. When this has been carried out, the holders 24b, 24b ... in the weighing station c that correspond to the selected weighing machinsd 21, 21 ... are driven inwardly of the walking beams 23, 23, as are the corresponding holders 24a, 24a ... in the holding station b. The walking beams 23, 23 are then actuated by the crank mechanisms 25, causing the inwardly projected holders 24b, 24b ... in the weighing station c to lift up the linear articles 1 from the weighing scales 20, 20 ... of the weighing machines 21, 21 ... selected as giving the best combination, and to carry the articles 1 to the belt conveyor 22 of the discharge station d where they are deposited and then delivered by the conveyor to an automatic packaging machine or the like. At the same time, the walking beams cause the inwardly projected holders 24a, 24a ... in the holding station b to lift the linear articles 1 from the stock receptacles 7, 7 ... corresponding to the selected weighing machines 21, 21 ..., and to carry these articles to the just emptied weighing scales 20, 20 ... of the selected weighing machines 21, 21 ..., thereby transferring the articles to said weighing scales to resupply them.

Next it is required to replenish the stock receptacles 7, 7 ... just emptied by the corresponding holders 24a, 24a. In other words, the stock receptacles to be replenished are those which correspond to the just selected weighing machines. These empty stock receptacles 7, 7 ... are released from the retaining plates 11, lowered by the second elevator 12, replenished with linear articles 1 and returned for retention by the retaining plates 11, through the aforementioned series of operations performed by the first and second pushing devices 10, 11, the first elevator 9, the main trough 2, and the corrugated trough 3. Those of the stock receptacles 7, 7 ... that did not take part in supplying the selected weighing machines 21, 21 ... continue to be retained by the retaining plates 11 and await the next cycle. It should be noted that the corrugated trough 3 which receives the articles 1 for replenishing the empty stock receptacles 7, 7 ... is projected beyond the leading edge of the main trough 2 by a number of corrugations 5 equivalent to the number of said empty stock receptacles. Furthermore, the weighing scales 20, 20 ... of the weighing machines 21, 21 ... that were not selected as giving the best combination continue to retain their linear articles 1, whose weight values will be used again in the next combination computation cycle.

The foregoing operations continue in the manner described to deliver a steady supply of the linear articles from the selected weighing machines.

In the conveyance apparatus described hereinabove, therefore, predetermined ones of the holders 24a, 24a ..., 24b, 24b ... corresponding to the stock receptacles 7 of the holding station b and the weighing machines 21 of the weighing station c are driven inwardly of the walking beams 23, 23 selectively in response to a combination signal from the above-mentioned computing circuit, and only these inwardly projected holders take part in the conveyance of the linear articles 1, thereby assuring the selective conveyance of the articles.

In the above embodiment the linear articles are supplied to and delivered from automatic weighing machines of the combinatorial type. It should be noted, however, that the inventive apparatus can be applied to any situation where linear articles are supplied to and delivered from arbitrary positions. Further, while the dispensing station $a_2$ has been described as using the corrugated trough 3 and the holding station b as employing the plurality of stock receptacles 7, other mechanisms deemed appropriate may be adopted.

Figure 16:
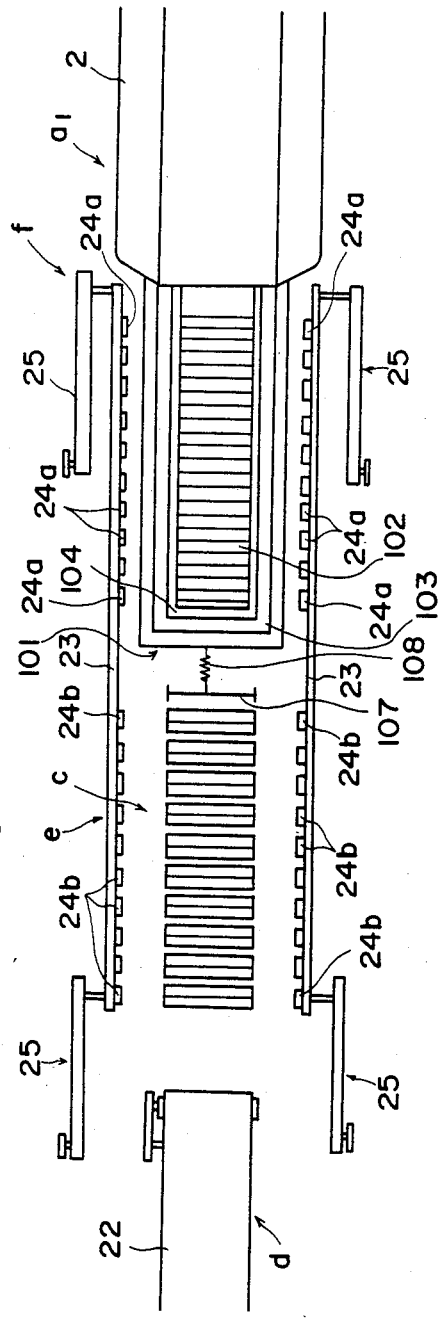
Figure 17:
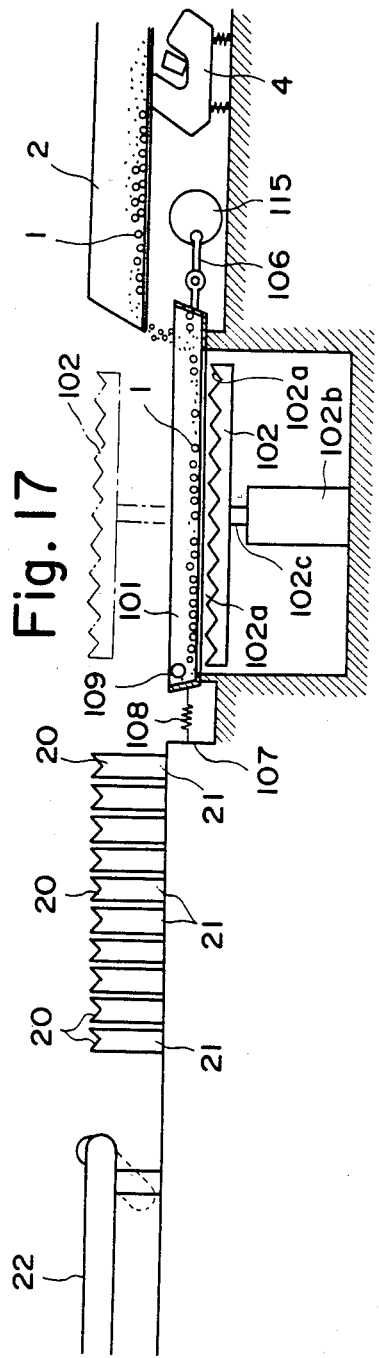

Reference will now be had to FIGS. 16 and 17 to describe a second embodiment of a conveyance apparatus in accordance with the present invention.

The apparatus illustrated in FIGS. 16 and 17 comprises a supply station $a_1$ for supplying linear or elongate articles 1 upon endowing them with a specific orientation, an arraying station f for collecting suitable amounts of the linear articles 1 received from the supply station $a_1$ and for arraying and leveling off these articles, a weighing station c for weighing the linear articles 1 which will be obtained from the arraying station f to perform a combinatorial weighing operation, a discharge station d for delivering linear articles which have been weighed and selected by the weighing station c to an automatic packaging machine or the like, and a selective conveyance station e for selectively delivering the linear articles 1 from the arraying station f to the weighing station c, and from the weighing station c to the discharge station d.

The supply station $a_1$, arraying station f, weighing station c and discharge station d are arranged continuously along a straight line in the conveyance direction, with the linear articles 1 being conveyed while oriented at right angles to the direction of travel. Further, the stations $a_1$, c, d and e have the same construction as their counterparts in the first embodiment of the conveyance apparatus.

The arraying station f includes an arraying tray 101 which receives the linear articles 1 from the main trough 2, and a stand-by tray 102 for taking up the linear articles from the arraying tray 101. The arraying tray 101 has a bottom 103 and is sufficiently wider than the linear articles 1 are long. It is also long enough for adequate dispersion of the linear articles. The bottom 103 of the arraying tray 101 has an opening 104 formed along its entire length, but the opening is not wide enough to allow the linear articles 1 to fall through. The purpose of the opening 103 is to allow the passage of the stand-by tray 102 therethrough, as will be described below.

The rearward end of the arraying tray 101 is pivotally coupled through a link 106 to the edge of a rotary disk 105, and the forward end is connected to the base 107 through a tensioned spring 108. Rotating the disk 105 causes the arraying tray 101 to be reciprocated back and forth with a constant amplitude owing to the action of the link 106 and tension spring 108, whereby the linear articles 1 are conveyed forwardly along the arraying tray so as to be levelled off and dispersed uniformly over its entire length. Provided at a suitable location on the arraying tray 101 is a level sensor 109 such as photoelectric switch or microswitch operable to sense the level of the linear articles 1 within the tray and to halt the vibration of the electromagnetic feeder 4 when a certain level has been reached, thereby terminating the delivery of articles from the main trough 2. When the articles are taken out of the arraying tray 101, the level sensor 109 reactuates the electromagnetic feeder 4 to resume the article feed.

The stand-by tray 102 is dimensioned to pass through the opening 104 of the arraying tray 101 but is large enough to support the linear articles 1, and the upper surface thereof is provided with a multiplicity of equally spacedapart V-shaped grooves 102a at right angles to the direction of article conveyance. The stand-by tray 102 is supported by the end of a piston rod 102c belonging to a cylinder 102b, and ordinarily is positioned beneath the arraying tray 101. Extending the piston rod 102c elevates the stand-by tray 102 through the opening 104 in the arraying tray 101, lifting the linear articles 1 from the arraying tray 101. Suitable quantities of these articles thus are dispersed among each of the V-shaped grooves 102a of the stand-by tray 102.

In the operation of the second embodiment of the conveyance apparatus described above, a feeding device (not shown) supplies the main trough 2 successively with linear articles 1 which are oriented at right angles to the direction of conveyance. The main trough 2 is vibrated by the electromagnetic feeder 4 in response to a weighing start signal, whereby the articles 1 are advanced along the main trough 2 (to the left in FIGS. 16 and 17) and fall into the arraying tray 101 from the forward edge of the main trough 2. The rotation of the rotary disk 105 starts at the same time as the delivery of the linear articles from the main trough 2, so that the arraying tray 101 is reciprocated back and forth to advance, level off and uniformly distribute the linear articles 1 which are being received from the main trough 2 as it vibrates. When the articles within the arraying tray 101 reach a certain level, the level sensor 109 senses the event and issues a signal which stops the vibration of the electromagnetic feeder 4 and the rotation of the rotary disk 105, thereby suspending the delivery of articles from the main trough 2 and the reciprocation of the arraying tray 101. When the arraying tray 101 stops moving, cylinder 102b is actuated to elevate the stand-by tray 102 through the opening 104 in the arraying tray 101, at which time the stand-by tray takes up the linear articles from the arraying tray, with suitable quantities of the linear articles being dispersed among each of the V-shaped grooves 102a thereof. Upward motion of the stand-by tray 102 stops when it has reached a point above the arraying tray 101. In this manner the linear articles 1 are transferred from the arraying tray 101 to the V-shaped grooves 102a in the stand-by tray 102.

With the stand-by tray 102 in the elevated position, the crank mechanisms 25 are actuated to move the walking beams 23, 23 in the manner described in connection with the first embodiment. The holders 24a, 24a . . . , 24b, 24b . . . provided on the walking beams 23, 23 are projected inwardly of the beams after they move upwardly past the arraying tray 101. As a result, the inwardly projected holders 24a, 24 . . . pick up the linear articles 1 at the ends thereof from the V-shaped grooves 102a, 102a . . . in the stand-by tray 102 as the walking beams 23, 23 pass by, and carry the linear articles over to the weighing scales 20, 20 . . . of the corresponding weighing machines 21, 21 . . . , where the articles are deposited as the walking beams pass by in their downward trajectory. It should be noted that the holders 24a, 24a . . . , 24b, 24b . . . ordinarily are projected inwardly of the walking beams in a selective manner. However, since the operation now being described is for the first or initial cycle, all of the above-mentioned holders are inwardly projected, so that the linear articles 1 on the stand-by tray 102 are delivered in their entirety to all of the weighing machines 21, 21.

When the stand-by tray 102 is emptied by the upward passage of the walking beams 23, 23, cylinder 102b retracts the piston rod 102c to lower the stand-by tray. Thenceforth the electromagnetic feeder 4 and rotary disk 105 are reactuated so that a fresh, evenly distributed and level supply of the linear articles 1 re-accumulates in the arraying tray 101 just as described above. This is followed by again elevating the stand-by tray 102 to refill its V-shaped grooves 102a, 102a. When this has been accomplished, the tray 102 "stands by" at the position above the arraying tray 101.

When the weighing scales 20, 20 receive the supply of articles 1 from the stand-by tray 102 as described above, each weighing machine 21, 21 weighs the articles received in its weighing scale and sends a signal indicative of the weighed value to the electronic computing circuit, not shown. This circuit computes combinations on the basis of the received weight values and selects the best combination, that is, the combination of weight values whose sum is equal or closest to a preset target value. When this has been carried out, the computing circuit issues an electric signal in response to which all of the holders 24a, 24a . . . , 24b, 24b . . . are retracted and the walking beams 23, 23 actuated. At the instant the walking beams 23, 23 move upwardly past the arraying tray 101, the holders 24b, 24b, . . . , 24a, 24a . . . , which correspond to those weighing machines 21, 21 . . . that give the best combination, are projected inwardly of the walking beams 23, 23 at the arraying and weighing stations f, c, respectively, by actuating the respective solenoids 30, shown in FIGS. 14 and 15. As the walking beams 23, 23 move upwardly past the weighing station c, the inwardly projected holders 24b, 24b . . . in the weighing station lift up the linear articles 1 from the weighing scales 20, 20 . . . of the weighing machines 21, 21 ... selected as giving the best combination, and carry the articles 1 over to the belt conveyor 22 of the discharge station d where they are deposited and then delivered by the conveyor to an external unit. At the same time, the walking beams cause the inwardly projected arraying station holders 24a, 24a ... corresponding to the selected weighing machines 21, 21, ... to lift the articles from the stand-by tray 102 and to carry them over to the just emptied weighing scales 20, 20 ... of the weighing machines 21, 21 ... , thereby transferring the linear articles 1 to said weighing scales to resupply them.

The weighing scales 20, 20 ... of the weighing machines 21, 21, ... that were not selected as giving the best combination continue to retain their linear articles 1 because the corresponding holders 24a, 24a, ... 24b, 24b were not driven inwardly during the previous cycle. The weight values measured by these weighing machines will be used again in computing the next combination. That is, the combination computing circuit will compute the next combination using these weight values along with the weight values from those weighing machines 21, 21 ... just resupplied with the linear articles 1, thereby newly selecting the best combination of weights whose sum is equal or closest to the preset target value. Then, in the manner described above, the weighing machines 21, 21 selected as contributing to this combination have their linear articles 1 carried over to the belt conveyor 22 by the walking beams 23, 23.

At the arraying station f, meanwhile, the stand-by tray 102 is lowered following the previous upward passage of the walking beams 23, 23. The linear articles 1 which remain in the V-shaped grooves 102a of the stand-by tray 102 because they were not engaged by the holders 24a, 24a, ... are lowered along with the stand-by tray and are returned to the arraying tray 101. Here the returned articles mix with articles newly provided by the main trough 2. Following the above-described leveling of the articles, the standby tray 102 is raised again to its stand-by position to distribute the articles within the V-shaped grooves 102a.

The foregoing operations are repeated to enable the linear articles 1 to be weighed automatically and continuously by combinatorial computations.

In accordance with the present invention as described and illustrated hereinabove, linear or elongate articles can be distributively supplied from a supply station to a plurality of locations, conveyed from the plurality of locations to each of a plurality of weighing machines in a weighing station, and then delivered from the weighing machines to a discharge station, without there being any change in the specific orientation of the articles in their conveyance from the supply station to the discharge station. Applying the conveyance apparatus of the present invention to a combination computing-type automatic weighing system thus makes it possible to achieve, for the first time, the combinatorial weighing of linear articles such as dried noodles. The inventive apparatus improves weighing accuracy and makes it possible to supply an automatic packaging machine or the like with fixed quantities of articles in automatic fashion. Further, the invention shortens weighing time since the supply and discharge of articles to and from the weighing machines take place simultaneously. The selection of the articles to be supplied and discharged is executed in reliable fashion by the simple expedient of projecting the holders mounted on the walking beams inwardly of said walking beams as the beams are moved.

As many apparently widely different embodiments of the present invention can be made without departing from the spirit and scope thereof, it is to be understood that the invention is not limited to the specific embodiments thereof except as defined in the appended claims.

What we claim is:

1. A conveyance apparatus for conveying linear articles while maintaining the specific orientation thereof, which apparatus comprises:

a supply station for supplying linear articles having a specific orientation, said supply station including an electromatic feeder, and a main trough vibrated by said electromagnetic feeder in such a manner as to dispense a required amount of the linear articles;

distribution means for distributing to a plurality of locations the linear articles supplied by said supply station, and for holding said linear articles at said locations, said distributing means including an arraying tray for receiving the linear articles dispensed by the main trough, said arraying tray having an opening in the bottom thereof, a mechanism for reciprocating said arraying tray along the direction of conveyance, and a stand-by tray adapted to be raised through the opening in said arraying tray, said stand-by tray having a multiplicity of V-shaped grooves in the floor thereof for receiving and holding the linear articles in said arraying tray as said stand-by tray is raised through said opening;

a pair of walking beams having a multiplicity of first holders disposed along the direction of conveyance for taking up the distributed linear articles;

a crank mechanism for oscillating said pair of walking beams while moving them in the direction of conveyance so that said first holders describe circular orbits;

first holder drive means provided on said walking beams for actuating the first holders corresponding to those linear articles that are to be conveyed from the linear articles previously distributed articles to said plurality of locations, in order that the linear articles to be conveyed may be taken up from said previously distributed articles, linear articles being distributed to said plurality of locations so as to be positioned on the circular orbits of the actuated first holders, the linear articles on the circular orbits of said first holders being taken up by said actuated first holders in the course of their circular orbits, and being conveyed forwardly in the direction of conveyance;

a weighing station provided with a plurality of weighing machines arranged in the direction of conveyance, each having a weighing scale, the linear articles distributed to said plurality of locations being conveyed selectively to the weighing scales of said weighing machines;

a multiplicity of second holders provided on said walking beams along the direction of conveyance for taking up the linear articles conveyed to the weighing scales of said weighing machines;

second holder drive means provided on said walking beams for actuating said second holders; and an electronic computing unit for forming combinations of weight values of the linear articles conveyed to the weighing scales of said weighing machines, for selecting from said combinations the best combination of weight values whose sum is closest to a preset target weight, and for causing said second holder drive means to actuate those second holders that correspond to the weighing machines which give said best combination of weight values, linear articles being deposited in each of said weighing scales so as to be positioned in the circular orbits of the actuated second holders, the linear articles on the circular orbits of said second holders being taken up by said actuated second holders in the course of their circular orbits and being conveyed to a discharge station and, at the same time, predetermined linear articles distributed to said plurality of locations are supplied to the weighing scales of said weighing machines that give the best combination, along the circular orbits of said first holders.

* * * * *

UNITED STATES PATENT AND TRADEMARK OFFICE
CERTIFICATE OF CORRECTION

PATENT NO. : 4,564,103
DATED : January 14, 1986
INVENTOR(S) : TAKASHI SASHIKI ET AL.

It is certified that error appears in the above—identified patent and that said Letters Patent is hereby corrected as shown below:

Col. 3, line 32, "bunding" should be --bundling--.

Col. 4, line 8, "of" should be --a--.

Col. 8, line 61, "recepticles" should be --receptacles--.

Col. 9, line 42, "machinsd" should be --machines--.

Signed and Sealed this

First Day of July 1986

[SEAL]

Attest:

DONALD J. QUIGG

Attesting Officer

Commissioner of Patents and Trademarks